(12) United States Patent
Xiu et al.

(10) Patent No.: US 12,280,801 B2
(45) Date of Patent: Apr. 22, 2025

(54) METHOD FOR OBSTACLE-AVOIDANCE IN SELF-DRIVING, SYSTEM, AND STORAGE MEDIUM

(71) Applicant: GUANGZHOU AUTOMOBILE GROUP CO., LTD., Guangzhou (CN)

(72) Inventors: Caijing Xiu, Guangzhou (CN); Weiqiang Liang, Guangzhou (CN); Jishun Guo, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 260 days.

(21) Appl. No.: 18/013,064

(22) PCT Filed: Apr. 25, 2022

(86) PCT No.: PCT/CN2022/088877
§ 371 (c)(1),
(2) Date: Dec. 27, 2022

(87) PCT Pub. No.: WO2022/228358
PCT Pub. Date: Nov. 3, 2022

(65) Prior Publication Data
US 2023/0303120 A1    Sep. 28, 2023

(30) Foreign Application Priority Data

Apr. 25, 2021 (CN) .......................... 202110448163.6

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/09* (2013.01); *B60W 40/072* (2013.01); *B62D 15/021* (2013.01); *B60W 2554/4049* (2020.02)

(58) Field of Classification Search
CPC ............ B60W 60/0015; B60W 30/09; B60W 40/072; B60W 2554/4049; B62D 15/021
See application file for complete search history.

(56) References Cited

FOREIGN PATENT DOCUMENTS

| WO | WO-2018205751 A1 | * | 11/2018 | ............... G05D 1/02 |
| WO | WO-2021142799 A1 | * | 7/2021 | ........... G06Q 10/047 |

OTHER PUBLICATIONS

Machine English Translation of WO-2018205751-A1 (Year: 2018).*
Machine English Translation of WO-2021142799-A1 (Year: 2021).*

* cited by examiner

*Primary Examiner* — Andrew J Cromer
(74) *Attorney, Agent, or Firm* — ScienBiziP, P.C.

(57) ABSTRACT

The present disclosure provides a method and system for obstacle-avoidance in a self-driving, a system, and a storage medium, comprises: obtaining information of the obstacles, the information including sets of coordinates of the obstacles; determining a feasible area according to the information; determining a waypoint according to the feasible area, and determining an attractive force of the waypoint according to the waypoint and a preset attractive potential field function; determining a repulsive force of the obstacles according to the coordinates of the obstacles on sides of the feasible area and a preset repulsive potential field function; and determining a total force according to the attractive force and the repulsive force, and a steering command issued accordingly. A defect of Artificial Potential Field deflecting into the local minimum, and problems of environmental constraints and the constraints of the vehicle itself in a structured urban environment are resolved.

14 Claims, 3 Drawing Sheets

(51) Int. Cl.
*B60W 40/072* (2012.01)
*B62D 15/02* (2006.01)

METHOD FOR OBSTACLE-AVOIDANCE IN SELF-DRIVING, SYSTEM, AND STORAGE MEDIUM

CROSS-REFERENCE TO RELATED APPLICATIONS

This application claims priority to Chinese Patent Application No. 202110448163.6, filed on Apr. 25, 2021, entitled "AUTONOMOUS DRIVING OBSTACLE AVOIDANCE METHOD AND SYSTEM, AND STORAGE MEDIUM" in the China Intellectual Property Office, the contents of which are incorporated by reference herein.

FIELD

The subject matter herein generally relates to vehicle technology, and particularly to a method for obstacle-avoidance in self-driving, a system, and a computer readable storage medium.

BACKGROUND

Artificial Potential Field is originally proposed by Khatib at 80's of the $20^{th}$ century according to a motion of an electron in an electric field. In detail, it mimics the concept of an electric field of a point charge in nature, and constructs an obstacle to a charged particle. The potential field around the obstacle negatively correlates with distance. Given that a controlled object carries the same charge, the controlled object tends to a local maximum away from the obstacle according to the principle of repelling each other in the same electric field. Thus, obstacle avoidance is achieved. In a similar way, the controlled object can carry an opposite charge, and the controlled object is guided to tend to close to a local minimum according to a principle of opposing electric fields attracting each other. Finally, various virtual potential fields are summed to construct a total potential field. The negative gradient direction of the total potential field is a direction of the virtual force. Basically, certain poses of the controlled object, the target object, and the obstacle, are abstracted and quantized to the virtual potential field or a virtual force field, and a unified virtual potential field or an unified virtual force in the environment of the controlled object is established. Thus the motion of the controlled object is planned.

Artificial Potential Field has gained widespread attention due to advantages of a good real-time performance, a high safety performance, a sparse environment information being needed, a smooth planning path, and so on. However, the application of an existing Artificial Potential Field on self-driving is easily deflected into the defects of local minimum and resulting deadlock, and a local minimum is formed and a waypoint (look-ahead point) for moving forward cannot be sustained. Moreover, the application does not consider the kinematic constraints of a self-driving vehicle, the dynamic constraints, and an association of the affected environmental constraints and the artificial potential, thus adaptability to environments and a reliability of obstacle-avoidance in self-driving does not satisfy safety requirements for driving.

SUMMARY

The present application is aim to provide a method for self-driving obstacle avoidance, a system, and a computer readable storage medium, which are to resolve a defect of Artificial Potential Field getting into the local minimum, and a problem of the environmental constraints of the self-driving vehicle and the constraints of the vehicle itself in a structured urban environment.

To achieve the aforementioned aim, a first aspect of the present application provides a method for obstacle-avoidance in self-driving comprising:

Obtaining information of the obstacles on the road, where the information of the obstacles includes at least sets of coordinates of the obstacles;

Determining a feasible area according to the information of the obstacles;

Determining a waypoint according to the feasible area, and determining an attractive force of the waypoint to an instant vehicle according to the waypoint and a preset attractive potential field function;

Determining a repulsive force of the obstacles to the instant vehicle according to the coordinates of the obstacles on sides of the feasible area and a preset repulsive potential field function; and Determining a total force according to the attractive force and the repulsive force, generating a steering angle control command according to the total force, and controlling a vehicle actuator to execute the steering angle control command to achieve obstacle avoidance.

Preferably, the determining of the feasible area according to the information of the obstacles, includes:

Determining visual borders of one or more obstacles according to the information of the obstacles, each obstacle including one or more visual borders;

Determining one or more feasible areas according to the visual borders of the one or more obstacles, a point O of a center of the body of the instant vehicle, and a minimum turn radius of the instant vehicle;

Obtaining safety factors of the one or more feasible areas according to borders of the feasible areas and a relative position between each obstacle and the instant vehicle, and obtaining a deviation between a direction of each feasible area and a current heading of the body of the vehicle and a deviation between the direction of each feasible area and a direction of a corresponding waypoint according to the borders of the feasible areas; and Selecting one feasible area from all the feasible areas to output as the feasible area which is optimal according to the safety factors, the deviation between the direction of each feasible area and the current heading of the body of the vehicle, and the deviation between the direction of each feasible area and the direction of the corresponding waypoint.

Preferably, the determining one or more feasible areas according to the visual borders of the one or more obstacles, the point O of the center of the body of the instant vehicle, and the minimum turn radius of the instant vehicle, includes:

Generating, for any obstacle, two arcs which are tangent to the heading of the instant vehicle respectively by a left boundary point of the obstacle, a right boundary point of the obstacle, and the point O. The left boundary point of the obstacle and the point O are made to be points of one of the two arcs, and the right boundary point of the obstacle and the point O are made to be points of the other arc, where an area between the two arcs is the infeasible area; and Generating two turn radius arcs according to the point O and the minimum turn radius of the instant vehicle, and determining whether a residual area excluding the infeasible area is the feasible area according to the two turn radius arcs, where boundaries of each feasible area includes a left arc and a right arc.

Preferably, the obtaining of safety factors of the one or more feasible areas according to borders of the feasible areas and a relative position between each obstacle and the instant vehicle, includes:

Using the point O as a center of a circle and the preset radius to generate a reference arc, and determining a width factor of each feasible area according to a length of an arc between a point B and a point C, and a length of an arc between a point A and a point D, where the point B and the point C are the points where the reference arc intersects with the left arc and the right arc, and the point A and the point D are points where the reference arc intersects with the two turn radius arcs;

Determining a point I of one obstacle closest to the instant vehicle from the points of the obstacles at sides of the feasible areas, and determining a factor of each obstacle according to a length of a straight line between the point O and the point I, a length of a straight line between the point B and the point C, a length of a straight line between the point O and the point C, and a width of the instant vehicle; and Determining a safety factor of each feasible area according to the width factor of each feasible area and the factor of each obstacle.

Preferably, the obtaining of the deviation between the direction of each feasible area and the current heading of the body of the vehicle and the deviation between the direction of each feasible area and the direction of the corresponding waypoint, includes:

Determining the deviation between the direction of each feasible area and the current heading of the body of the vehicle according to a radius of the arc on a left side of each feasible area and a radius of the arc on a right side of a corresponding feasible area; and Determining the deviation between the direction of each feasible area and the direction of the corresponding waypoint according to a radius of a connecting arc between each waypoint and a center of mass of the vehicle, the radius of the arc being on the left side of each feasible area and the radius of the arc being on the right side of the corresponding feasible area.

Preferably, the determining of the attractive force of the waypoint to the instant vehicle according to the waypoint and the preset attractive potential field function, includes:

Determining a longitudinal action parameter of the attractive force according to a difference in longitudinal coordinate between the waypoint and the point of the center of the body of the instant vehicle and a longitudinal action distance of the attractive force field on the instant vehicle, and determining a horizontal action parameter of the attractive force according to a difference in horizontal coordinate between the waypoint and the point of the center of the body of the instant vehicle, and a horizontal action distance of the attractive force field on the instant vehicle; and Determining the attractive force of the waypoint to the instant vehicle according to the longitudinal action parameter of the attractive force, the horizontal action parameter of the attractive force, and a preset gain factor of the attractive force.

Preferably, the determining of the repulsive force of the obstacles to the instant vehicle according to the coordinates of the obstacles on sides of the feasible area and the preset repulsive potential field function, includes:

Determining a longitudinal action parameter of the repulsive force according to a difference in longitudinal coordinate between each obstacle and the point of center of a body of the instant vehicle, and a longitudinal action distance of the repulsive force field on the instant vehicle, and determining a horizontal action parameter of the repulsive force according to a difference in horizontal coordinate between each obstacle and the point of the center of the body of the instant vehicle, and horizontal action distance of the repulsive force field on the instant vehicle; and Determining the repulsive force of each obstacle to the instant vehicle according to the longitudinal action parameter of the attractive force, the horizontal action parameter of the repulsive force, and a preset gain factor of the repulsive force.

Preferably, the determining of the total force according to the attractive force and the repulsive force, and generating the steering angle control command according to the total force, includes:

Determining an angle between the instant vehicle and the waypoint according to the coordinates of the waypoint, determining a longitudinal force of the attractive force and a horizontal force of the attractive force according to the angle and the attractive force, and determining a longitudinal force of the repulsive force and a horizontal force of the repulsive force according to the angle and the repulsive force;

Determining a longitudinal force of the total force according to the longitudinal force of the attractive force and the longitudinal force of the repulsive force, and determining a horizontal force of the total force according to the horizontal force of the attractive force and the horizontal force of the repulsive force; and Determining a steering angle according to the longitudinal force of the total force and the horizontal force of the total force, and generating the steering angle control command according to the steering angle.

Corresponding to the aforementioned method, a second aspect of the present application provides a system for obstacle-avoidance in self-driving, comprising:

An obstacle information obtaining unit, being configured to obtain information of the obstacles on the road, where the information of the obstacles includes at least sets of coordinates of the obstacles;

A feasible area determining unit, being configured to determine a feasible area according to the information of the obstacles;

An attractive force determining unit, being configured to determine a waypoint according to the feasible area, and determining an attractive force of the waypoint to an instant vehicle according to the waypoint and a preset attractive potential field function;

A repulsive force determining unit, being configured to determining a repulsive force of the obstacles to the instant vehicle according to the coordinates of the obstacles on sides of the feasible area and a preset repulsive potential field function; and An obstacle avoidance control unit, being configured to determine a total force according to the attractive force and the repulsive force, generating a steering angle control command according to the total force, and controlling a vehicle actuator to execute the steering angle control command to achieve obstacle avoidance.

A third aspect of the present application provides a computer readable storage medium where computer executable instructions are stored herein, the computer executable instructions are used for executing the steps of method for obstacle-avoidance in self-driving of the first aspect when the computer executable instructions are executed by at least one processor.

According to the defect of the artificial potential field deflecting into the local minimum, and the problem of the environmental constraints of the self-driving vehicle and the constraints of the vehicle under a structured urban environment, the disclosure determines the feasible area according to the information of the obstacles in the direction of travel of the self-driving vehicle on the road, and determines a waypoint according to the feasible area, and establishes the attractive potential field function according to the waypoint. The disclosure further establishes the repulsive potential field function according to the obstacles on sides of the feasible area, thus a new artificial potential field model is provided. The artificial potential field model well reflects the strength of the potential field of a virtual potential field to a self-driving vehicle under environmental constraints. Thus, the defect of the artificial potential field deflecting into the local minimum and the problem of the environmental constraints of the self-driving vehicle and the constraints of the vehicle itself in a structured urban environment can be resolved, thus adaptability to environments and a reliability of the obstacle avoidance in self-driving is improved.

Other features and advantages of the preset disclosure will be described in the following specification.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION

Various exemplary examples, features and aspects of the present disclosure will be described in detail below with reference to the attached drawings. In addition, in order to better illustrate the present disclosure, numerous specific details are set forth in the detailed description hereinafter. Those skilled in the art should understand that the present disclosure may also be implemented without certain specific details. In other examples, means or techniques which are well-known to those skilled in the art are not described in detail, so as to highlight the spirit of the present disclosure.

Figure 1:
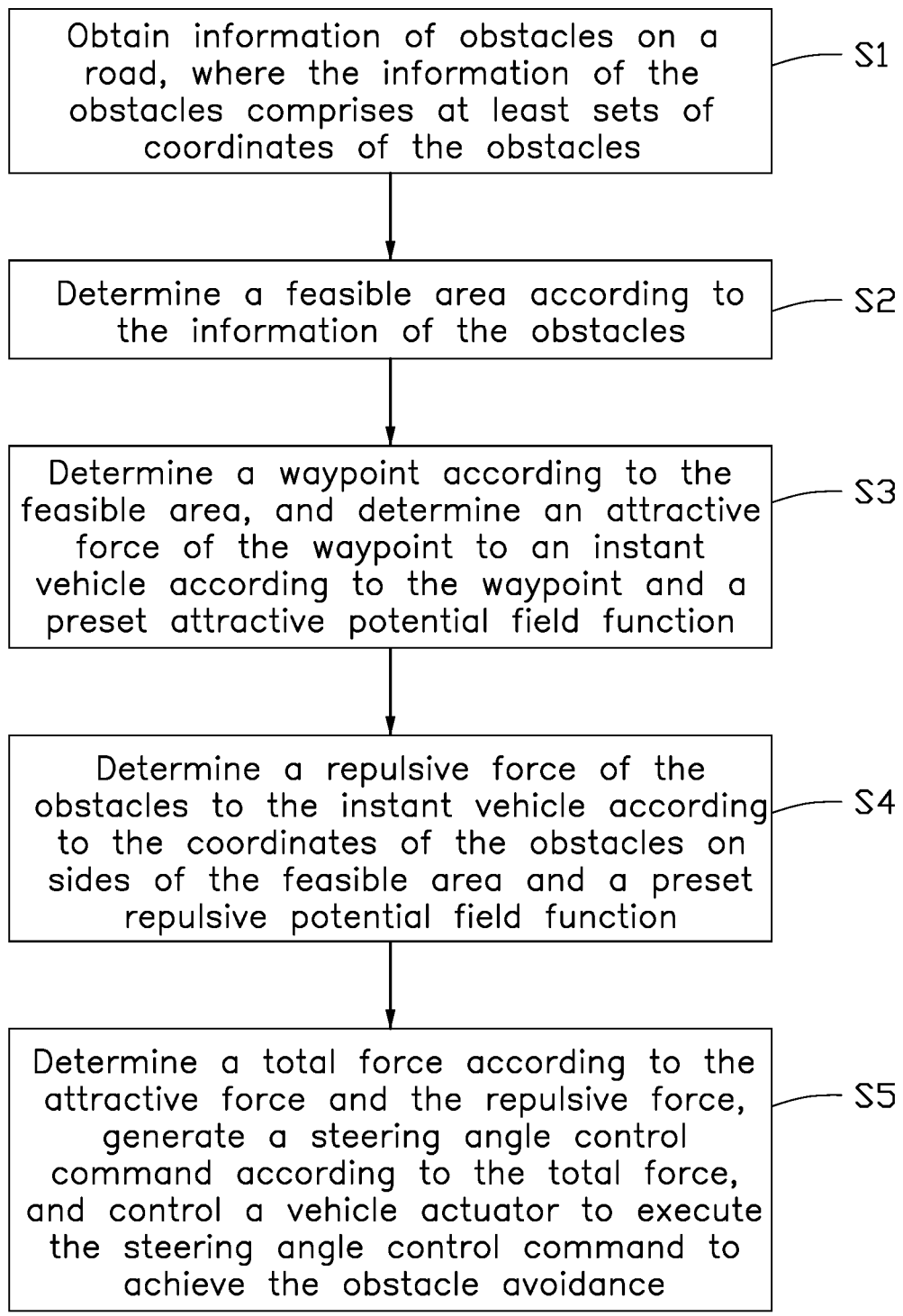
FIG. 1 is a flowchart of a method for obstacle-avoidance in self-driving according to the present disclosure.

An embodiment of the application provides a method for self-driving obstacle avoidance, which is adaptable for a self-driving vehicle and can accomplish obstacle avoidance in a self-driving system of a self-driving vehicle. Referring to FIG. 1, the method of the embodiment of the instant application includes steps S1~S6 as follows:

Step S1: obtaining information of the obstacles on the road, where the information of the obstacles includes at least sets of coordinates of the obstacles;

In detail, the self-driving vehicle is equipped with sensor for sensing obstacles, and the sensor for sensing obstacles can detect the information of the obstacles on the road ahead in real time when the self-driving vehicle is moving on the road. The other objects on the road and influencing a driving of the self-driving vehicle can be considered as the obstacles, for example, vehicles, pedestrians, or the like. For most of the system for self-driving obstacle avoidance, usually, the information of the obstacles is sensed by the sensor and is output as original data which is a series of sets of coordinates of borders of obstacles.

Step S2: determining a feasible area according to the information of the obstacles;

It can be understood that, determining which of one or more areas on the road ahead are the feasible areas is carried out according to the information of the obstacles. The determining manner of the feasible areas can be various, and the embodiments is not limited herein.

Step S3: determining a waypoint according to the feasible area, and determining an attractive force of the waypoint to the instant vehicle according to the waypoint and a preset attractive potential field function;

In detail, during a driving of the self-driving vehicle, the waypoint for the self-driving vehicle can dynamically determined. The waypoint can be understood as a forward target point of the self-driving vehicle, namely, a position point that the self-driving vehicle will arrive at in the future during the self-driving, the vehicle being expected to pass through the feasible area. The waypoint is a point guiding a driving of the self-driving vehicle, namely, the waypoint and the self-driving vehicle can attract each other in the artificial field, attracting the self-driving vehicle to the waypoint.

It can be understood that, the waypoint should be a position point in the feasible area. Thus, the waypoint can be determined according to the feasible area. Usually, the waypoint is a point selected from the center line of the road. The center line of the road and a selection of the waypoint is known to those of ordinary skill in self-driving art, which will not be repeated here. The disclosure aims to determine the attractive force of the attractive potential field by using the waypoint.

Step S4: determining a repulsive force of the obstacles to the instant vehicle according to the coordinates of the obstacles on sides of the feasible area and a preset repulsive potential field function;

In detail, when the self-driving vehicle is driven to pass through the feasible area, the self-driving vehicle can be influenced by the obstacles on sides of the feasible area, thus the self-driving vehicle and the obstacles are repulsed from each other in the artificial field. The repulsion between each other is relevant to a relative position between each other, thus the repulsive potential field function can be established via established sets of coordinates of the obstacle and an established sets of coordinates of the self-driving vehicle.

Step S5: determining a total force according to the attractive force and the repulsive force, generating a steering angle control command according to the total force, and controlling a vehicle actuator to execute the steering angle control command to achieve the obstacle avoidance.

According to the defect of the artificial potential field deflecting into the local minimum, and the problem of the environmental constraints of the self-driving vehicle and the constraints of the vehicle under a structured urban environment, the method of the embodiment determines the feasible area according to the information of the obstacles on a road forward of the self-driving vehicle, and determines a waypoint according to the feasible area, and establishes the attractive potential field function according to the waypoint. The disclosure further establishes the repulsive potential field function according to the obstacles on sides of the feasible area, thus a new artificial potential field model is provided. The artificial potential field model well reflects the strength of the potential field of a virtual potential field to a self-driving vehicle having the environmental constraints. Thus, the defect of the artificial potential field getting into the local minimum and the problem of the environmental constraints of the self-driving vehicle and the constraints of the vehicle itself under a structured urban environment can be resolved, thus an adaptability to environments and a reliability of the obstacle-avoidance in self-driving can be improved.

According to a method of the aforementioned embodiment, in an example, the step S2 includes steps S21~S24:

Step S21: determining visual borders of one or more obstacles according to the information of the obstacles, each obstacle including one or more visual borders.

Figure 2:
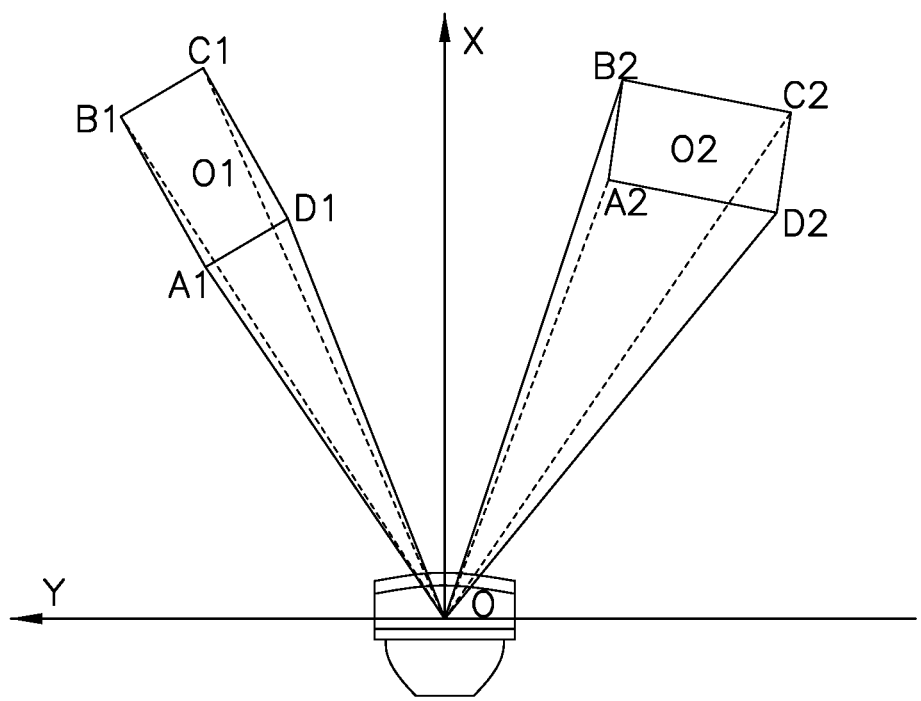
FIG. 2 is a view of visual borders of obstacles according to the present disclosure.

In detail, a series of sets of coordinates of the visual borders of the obstacles can be obtained via the sensor. In the embodiment, a definition is given to the visual borders of each obstacle: supposing that the obstacle is a polygon, it represents the obstacle's number and the obstacle has many vertices, and for the obstacle being an ellipse or a circle in sharp, the obstacle can be formed by an inscribed regular polygon of the ellipse or the circle. In practice, the information of the obstacles is obtained via taking the sensor as the coordinate origin and performing a coordinate transformation based on an installation position of the sensor on the vehicle, namely the information of the visual borders of the obstacles in a vehicle coordinate system. In the vehicle coordinate system, by connecting a coordinate origin O and each vertex of the visual borders of each obstacle with line segments, N line segments are obtained, and a second polygon encompassing all the line segments but excluding the obstacle itself is obtained. One or more edges in all of the edges of the second polygon which are the edges of the obstacle are determined, namely the borders of a corresponding visual obstacle are obtained. As shown in FIG. 2, four vertices of the obstacle O1, and four vertices of the obstacle O2 are connected with the origin O to respectively obtain four line segments. The second polygon which encompasses all corresponding line segments but excludes the obstacle is O-A1-D1, the second obstacle O2 is O-B2-A2-D2. Thus the visual border of the obstacle O1 is A1-D1, the visual borders of the obstacle O2 is A2-B2 and A2-D2.

Step S22: determining one or more feasible areas according to the visual borders of the one or more obstacles, a point O of the center of the body of the instant vehicle, and a minimum turn radius of the instant vehicle.

Figure 3:
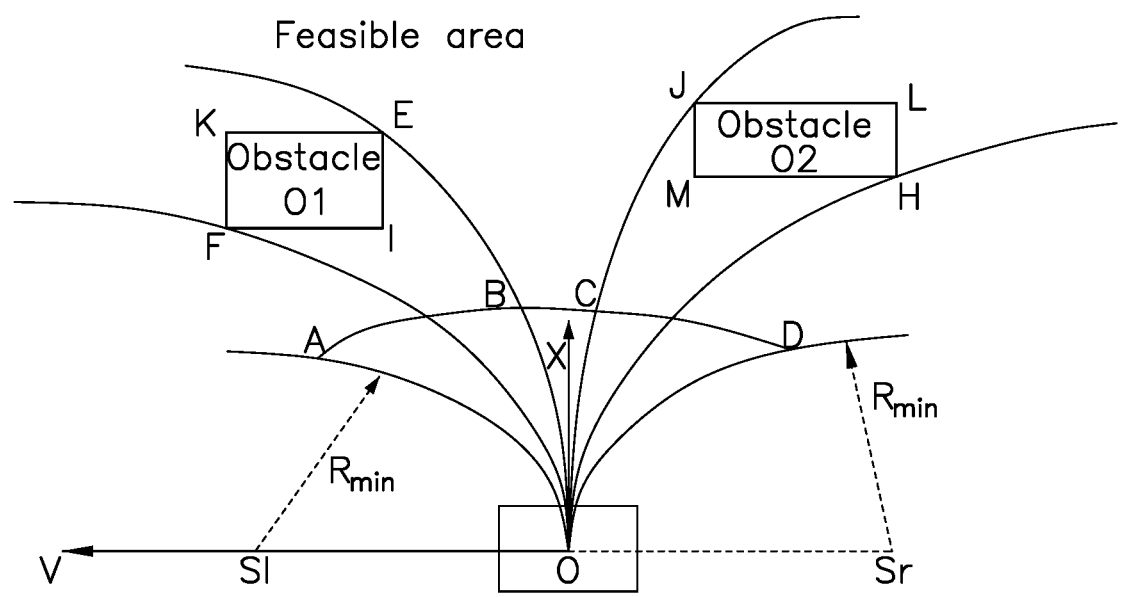
FIG. 3 is a view of obstacle constraints according to the present disclosure.

For example, the step S22 can include:

Referring to FIG. 3, generating, for any obstacle, two arcs which are tangent to the heading of the instant vehicle respectively by a left boundary point of the obstacle, a right boundary point of the obstacle, and the point O. The left boundary point of the obstacle and the point O are made to be points of one arc of the two arcs, and the right boundary point of the obstacle and the point O are made to be points of the other arc, where an area between the two arcs is the infeasible area. For example, a point F and a point E in the obstacle O1 are the left boundary point of the obstacle O1 and the right boundary point of the obstacle O1, thus an arc OF and an arc OE are obtained, and an area between the arc OF and the arc OE can be determined to be infeasible areas. A point J and a point H in the obstacle O2 are the left boundary point of the obstacle O2 and the right boundary point of the obstacle O2, thus an arc OJ and an arc OH are obtained, and an area between the arc OJ and the arc OH can be determined to be infeasible areas.

In detail, a principle of generating two arcs which are tangent to the heading of the instant vehicle are as follow: drawing an envelope curve of the arc to each obstacle by taking the point of the center of the body of the self-driving vehicle, the left boundary point of the obstacle, and the right boundary point of the obstacle as the points of the arc. The arc is tangent to the heading of the instant vehicle. Suppose $(O_x, O_y)$ are sets of coordinates of the left boundary point of the obstacle or the right boundary point of the obstacle in the vehicle coordinate system at a time t, the corresponding radius of the arc can be determined according to following formula:

$$R = \begin{cases} (O_x^2 + O_y^2)/(2O_x) & O_x \neq 0 \\ 0 & O_x = 0 \end{cases}$$

For any obstacle i within a vision range of the self-driving vehicle, the infeasible areas of the obstacle i are always formed by two arcs $O_{Li}$ and $O_{Ri}$ which are tangent to the heading of the vehicle, where $O_{Li}$ is a left arc curve segment of the obstacle i, and $O_{Ri}$ is a right arc curve segment of the obstacle i. In the vehicle coordinate system, O is the point of the center of the body of the vehicle, $O_{Li}(O_{Lix}, O_{Liy})$ and $O_{Ri}(O_{Rix}, O_{Riy})$ are the sets of coordinates of the left boundary point and the right boundary point of the obstacle i obtained from the sensor, thus $O_{Li}$ and $O_{Ri}$ in the equation are:

$O_{Li}: f_{O_{Li}}(x,y) = (x-R_{Li})^2 + y^2 - R_{Li}^2 = 0$ $y > 0$ $|x| \leq |O_{Lix}|$ $O_{Ri}: f_{O_{Ri}}(x, y) = (x-R_{Ri})^2 + y^2 - R_{Ri}^2 = 0$ $y > 0$ $|x| \leq |O_{Rix}|$ Two turn radius arcs are generated according to the point O and the minimum turn radius $R_{min}$ of the instant vehicle, for example two turn radius arcs at a left side and a right side of the point O. Whether or not a residual area excluding the infeasible area is the feasible area is determined according to the two turn radius arcs, thus one or more feasible areas can be determined; where boundaries of each feasible area includes a left arc and a right arc;

In detail, the minimum turn radius of the self-driving vehicle is a constraint of the vehicle itself. The minimum turn radius refers to a radius of a track circle that a center of an outer steering wheel rolls on a support plane when a steering wheel turns to a limit position and the self-driving vehicle turns at the lowest stable speed. The minimum turn radius largely characterizes an ability that the self-driving vehicle can pass through a narrow tortuous region or navigate around the non-traversable objects. The less the turning radius, the better are the maneuvering characteristics of the self-driving vehicle. The area where the self-driving vehicle cannot be arrived is the infeasible area of the self-driving vehicle. Thus, the arc which is less than the minimum turn radius $R_{min}$ of the self-driving vehicle cannot be followed. Thus, in the aforementioned arcs, if $|R| < R_{min}$, the regions excluding the arcs are all infeasible area. For $|R| >= R_{min}$, the infeasible area $Z_{oneobstacle}$ can be described via an equation of the left arc and the right arc, as follows:

$$Z_{one_{obstacle}} = f_{OLi}(x,y) > 0 \cap f_{ORi}(x,y) < 0$$

It can be understood that the area excluding the infeasible area are all the feasible areas. Usually a number of obstacles exist on the road, and a number of feasible areas spaced apart by the infeasible areas via the operations in the aforementioned steps are established.

Step S23: obtaining safety factors of the one or more feasible areas according to borders of the feasible areas and a relative position between each obstacle and the instant vehicle, and obtaining a deviation between a direction of each feasible area and a current heading of the body of the vehicle and a deviation between the direction of each feasible area and a direction of a corresponding waypoint according to the borders of the feasible areas.

In detail, to select an area having a higher safety from a number of feasible areas, the safety $S_{safety}$ of each feasible area is therefore considered. There are mainly two factors influencing the safety of each feasible area, respectively a width of the feasible area and a relative position between each of the obstacles on sides of the feasible area and the instant vehicle. The closer the obstacle may be to the instant vehicle, the greater is the influence. The safety $S_{safety}$ of the ith feasible area can be expressed by the following formula:

$$S_{safety} = f(W_i, D_i)$$

Where, $W_i$ is a width factor of the ith feasible area, representing a width of the feasible area, and $D_i$ is an obstacle factor of the ith feasible area, representing a position which is influenced by the obstacle.

For example, the step S23 includes steps S231~S233:

Step S231, using the point O as a center of a circle and the preset radius to generate a reference arc, and determining a width factor of each feasible area according to a length of an arc between a point B and a point C and a length of an arc between a point A and a point D, where the point B and the point C are the points where the reference arc intersects with the left arc and the right arc, and the point A and the point D are points where the reference arc intersects with the two turn radius arcs.

In detail, referring to FIG. 3, the origin of the vehicle coordinate system as a center of the circle and any fixed radius to generate the arc are used. The arc intersects with the boundary arcs of the feasible areas at the point B and the point C, and intersects with the minimum turn radius arc of the self-driving vehicle at the point A and the point D. Thus the width factor of the ith feasible area is defined as:

$$W_i = \widehat{BC} / \widehat{AD}$$

Where $\widehat{BC}$ is a length of the arc between the B and the C, and $\widehat{AD}$ is a length of the arc between the A and D.

Step S232, determining a point I of one obstacle closest to the instant vehicle from the points of the obstacles at sides of the feasible areas, and determining a factor of each obstacle according to a length of a straight line between the pint O and the pint I, a length of a straight line between the point B and the point C, a length of a straight line between the point O and the point C, and a width of the instant vehicle.

In detail, the influence of the relative position of the obstacles on the sides can be determined via comparing to determine a closest obstacle point, namely a point I in the FIG. 3, thus the obstacle factor of the ith feasible area is:

$$D_i = (OI*BC)/(OC*W_{car})$$

Where $W_{car}$ is a width of the vehicle, and OI, BC, and OC are each a length of a straight line segment between two points.

Step S233, determining a safety factor of each feasible area according to the width factor of each feasible area and the factor of each obstacle.

In detail, $S_{safety} = f(W_i, D_i)$ an expression for expressing a relationship of the safety, the safety factor, the width factor, and the obstacle factor. The calculating formula can be a manner of a weighted sum calculation. In detail, the weights of the width factor and the obstacle factor can be adjusted according to an actual technology requirement. Thus, due to a difference in factors of the preset radius, a size of the determined width factor can be also adjusted. Thus, it can be suitable adjusted according to the actual needs.

Otherwise, a selection of the feasible area should further consider the following two aspects, a comfort-related deviation between each feasible area and a current heading of the body of the vehicle, and an operation efficiency related deviation between each feasible area and a direction of a corresponding waypoint.

For example, the obtaining of the deviation between the direction of each feasible area and the current heading of the body of the vehicle and the deviation between the direction of each feasible area and the direction of the corresponding waypoint according to the borders of the feasible areas, includes:

Determining the deviation between the direction of each feasible area and the current heading of the body of the vehicle according to a radius of the arc on a left side of each feasible area and a radius of the arc on a right side of a corresponding feasible area. In detail, the deviation between the direction of each feasible area and the current heading of the body of the vehicle is determined according to a formula $$H_{deviation}(i) = \min\left\{\left|\frac{1}{R_{Li}}\right|, \left|\frac{1}{R_{Ri}}\right|\right\}.$$

Wherein $H_{deviation}(i)$ is a deviation between the direction of the ith feasible area and the current heading of the body of the vehicle, $R_{Li}$ is the radius of the arc on a left side of the ith feasible area, and $R_{Ri}$ is the radius of the arc on a right side of the ith feasible area; and Determining the deviation between the direction of each feasible area and the direction of the corresponding waypoint according to a radius of a connecting arc between each waypoint and a center of mass of the vehicle, the radius of the arc on the left side of each feasible area, and the radius of the arc on the right side of the corresponding feasible area;

In detail, the deviation between the direction of each feasible areas and the direction of the corresponding waypoint is determined according to a formula $$G_{deviation}(i) = \min\left\{\left|\left(\frac{1}{R_g} - \frac{1}{R_{Li}}\right)\right|, \left|\frac{1}{R_g} - \frac{1}{R_{Ri}}\right|\right\};$$

where, $G_{deviation}(i)$ is a deviation between the direction of the ith feasible area and the direction of the corresponding waypoint, and $R_g$ is the radius of the connecting arc between the waypoint and a center of the mass of the vehicle.

Step S24: selecting one feasible area from the feasible areas to output as the feasible area which is optimal according to the safety factors, the deviation between the direction of each feasible area and the current heading of the body of the vehicle, and the deviation between the direction of each feasible area and the direction of the corresponding waypoint.

For example, the selection of the feasible area can be determined by employing a following cost function, the cost function of the ith feasible area is:

$$C_i = k_s S_{safety}(i) + k_h H_{deviation}(i) + k_g G_{deviation}(i)$$

Where $k_s$, $k_h$, $k_g$ are respectively a weight coefficient of a safe factor, a weight coefficient of a deviation factor of the heading, and a weight coefficient of a deviation factor of the target point. The weights can be set according to the biases of the three factors. One feasible area can be determined according to a determination of the cost function of the feasible areas. A minimum value of the cost function is the feasible area which is optimal. Simultaneously, a largest threshold of the cost function also needs to be set. If greater than the threshold, it illustrates that the cost is too high, and is infeasible.

According to the method of the aforementioned embodiment, in an example, the step S3 incudes:

Determining a longitudinal action parameter of the attractive force according to a difference in longitudinal coordinate between the waypoint and the point of the center of the body of the instant vehicle and a longitudinal action distance of the attractive force field on the instant vehicle, and determining a horizontal action parameter of the attractive force according to a difference in horizontal coordinate between the waypoint and the point of the center of the body of the instant vehicle, and a horizontal action distance of the attractive force field on the instant vehicle; and Determining the attractive force of the waypoint to the instant vehicle according to the longitudinal action parameter of the attractive force, the horizontal action parameter of the attractive force, and a preset gain factor of the attractive force.

In detail, as applied, the artificial field on the obstacle avoidance of the self-driving vehicle should meet four basic conditions. Firstly, it should be capable of avoiding the inherent defect of a conventional artificial field function. Secondly, the target point function of its potential field function is further required to reflect the dynamic target point of the self-driving vehicle. Thirdly, the potential field of the potential field function should be capable of reflecting strength of influence of the structured urban environment to the self-driving vehicle at each distance direction. Fourth, there is a certain mapping relationship between a certain variation and the dynamic constraints of the vehicle. However, some characters of a GAUSSIAN function satisfy the condition, thus an artificial field based on the GAUSSIAN function is established. In the embodiment, a preset attractive potential field function is shown as the following formula:

$$U_{att} = k_{att}^* \left( 1 - \exp\left( -\left( \frac{(X - X_g)^2}{2 * d_{attx}^2} + \frac{(Y - Y_g)^2}{2 * d_{atty}^2} \right)^{I_g} \right) \right)$$

Where (X, Y) is the sets of coordinates of the point of the center of the body of the instant vehicle in a global coordinate system, $(X_g, Y_g)$ is the sets of coordinates of the waypoint in the global coordinate system, $k_{att}$ is a gain coefficient of an attractive potential, $d_{attx}$ is a longitudinal action distance of the force field on the instant vehicle, $d_{atty}$ is a horizontal action distance of the attractive force field on the instant vehicle, and $I_g$ is a preset integer reflecting a boundary of the strength of the potential field.

In the embodiment, determining the waypoint according to the feasible area, and determining the attractive force of the waypoint to the instant vehicle according to the waypoint and the preset attractive potential field function, is shown as the following formula in detail:

$$\vec{F} = -\nabla U_{att} \vec{a_G} = \frac{\partial U_{att}}{\partial X} i + \frac{\partial U_{att}}{\partial Y} j = \left( \left( \frac{\partial U_{att}}{\partial X} \right)^2 + \left( \frac{\partial U_{att}}{\partial Y} \right)^2 \right)^{\frac{1}{2}} \cdot \vec{a_G} =$$

$$K_{att}' \vec{a_G} \exp\left( -\left( \frac{(X - X_g)^2}{2 * d_{attx}^2} + \frac{(Y - Y_g)^2}{2 * d_{atty}^2} \right)^{I_g} \right) * \left( \frac{(X - X_g)^2}{2 * d_{attx}^2} + \frac{(Y - Y_g)^2}{2 * d_{atty}^2} \right)^{(I_g - \frac{1}{2})}$$

Where $$\vec{a_G}$$

is an unit vector pointing to an attractive point from the point O, $K_{att}'$ is a gain coefficient of the attractive force, $$\frac{(X - X_g)^2}{2 * d_{attx}^2}$$

is a longitudinal action parameter of the attractive force, and $$\frac{(Y - Y_g)^2}{2 * d_{atty}^2}$$

is a horizontal action parameter of the attractive force.

In one example, the step S4 incudes:

Determining a longitudinal action parameter of the attractive force according to a difference in longitudinal coordinate between the waypoint and the point of the center of the body of the instant vehicle and a longitudinal action distance of the attractive force field on the instant vehicle, and determining a horizontal action parameter of the attractive force according to a difference in horizontal coordinate between the waypoint and the point of the center of the body of the instant vehicle, and a horizontal action distance of the attractive force field on the instant vehicle; and Determining the attractive force of the waypoint to the instant vehicle according to the longitudinal action parameter of the attractive force, the horizontal action parameter of the attractive force, and a preset gain factor of the attractive force.

Where, the obstacles can be detected via a sensing system, for example LIDAR. After obtaining point cloud of the borders of the obstacles, a relative coordinate of one point of each obstacle which is closest to the vehicle (namely a longitudinal closest point) and a relative coordinate of an extreme boundary point of each obstacle (namely a lateral closest point) are obtained. A repulsive potential field and an influencing distance of a conventional repulsive potential field model at a boundary of each obstacle are always invariable, and the repulsive potential field of the conventional repulsive potential field model is sharply increased when coming closer to the corresponding obstacle. However, for self-driving vehicle, the influencing distance and the repulsive potential field of one obstacle to the self-driving vehicle are variable, and the influencing distance of the longitudinal repulsive potential field should be largely greater than the repulsive potential field exerted by the obstacle lateral to the self-driving vehicle in a forward direction of the self-driving vehicle. A variation of the repulsive potential field should be smooth. If it is too sharp, the vehicle actuator of the vehicle will be caused to be not capable of executing and a comfort of the vehicle will be influenced. Thus, the preset repulsive potential field of the embodiment can be expressed as the following formula:

$$U_{rep}(i) = k_{rep}^* \exp\left(-\left(\frac{(X-X_o(i))^2}{2*d_{repx}(i)^2} + \frac{(Y-Y_o(i))^2}{2*d_{repy}(i)^2}\right)^{I_o}\right)$$

Where $d_{repx}(i)$ is a distance of a longitudinal action between the repulsive force field of the ith obstacle and the instant vehicle, $d_{repy}(i)$ is a distance of a horizontal action between the repulsive force field of the ith obstacle and the instant vehicle, $I_O$ is a preset integer, $(X, Y)$ is the sets of coordinates of the point of the center of the body of the instant vehicle in the global coordinate system, $(X_O(i), Y_O(i))$ and the sets of coordinates of the point of ith obstacle which is closest to the vehicle in the global coordinate system, and $k_{rep}$ is a gain coefficient of the repulsion potential.

In the embodiment, determining a repulsive force of the obstacles to the instant vehicle according to the coordinates of the obstacles on sides of the feasible area and a preset repulsive potential field function, is shown as the following formula in detail:

$$\vec{F}_{rep}(i) = -\nabla U_{rep}(i) =$$

$$\frac{\partial U_{rep}(i)}{\partial X}i + \frac{\partial U_{rep}(i)}{\partial Y}j = \left(\left(\frac{\partial U_{rep}(i)}{\partial X}\right)^2 + \left(\frac{\partial U_{rep}(i)}{\partial Y}\right)^2\right)^{\frac{1}{2}} \cdot \vec{a}_o =$$

$$k'_{rep} * \vec{a}_o \exp\left(-\left(\frac{(X-X_o(i))^2}{2*d_{repx}(i)^2} + \frac{(Y-Y_o(i))^2}{2*d_{repy}(i)^2}\right)^{I_o}\right) *$$

$$\left(\frac{(X-X_o(i))^2}{2*d_{repx}(i)^2} + \frac{(Y-Y_o(i))^2}{2*d_{repy}(i)^2}\right)^{(I_o-1/2)}$$

Where $\vec{F}_{rep}(i)$ is the repulsive force of the repulsive force field of the ith obstacle to the instant vehicle, $k_{rep}'=4*k_{rep}*I_O$, $\vec{a}_O$ is an unit vector pointing to the repulsive force point from O, $$\frac{(X-X_0(i))^2}{2*d_{repx}^2}$$

is a longitudinal action parameter of the repulsive force, and $$\frac{(Y-Y_0(i))^2}{2*d_{repy}^2}$$

is a horizontal action parameter of the attractive force.

In the embodiment, the step S5 includes:

Step S51, determining an angle between the instant vehicle and the waypoint according to the coordinates of the waypoint, determining a longitudinal force of the attractive force and a horizontal force of the attractive force according to the angle and the attractive force, and determining a longitudinal force of the repulsive force and a horizontal force of the repulsive force according to the angle and the repulsive force;

Step S52, determining a longitudinal force of the total force according to the longitudinal force of the attractive force and the longitudinal force of the repulsive force, and determining a horizontal force of the total force according to the horizontal force of the attractive force and the horizontal force of the repulsive force; and Step S53, determining a steering angle according to the longitudinal force of the total force and the horizontal force of the total force, and generating the steering angle control command according to the steering angle.

In detail, the direction of the total force decides a movement direction of the controlled object. In a vehicle coordinate system, the attractive force and the repulsive force are respectively divided into force components in two coordinate axes. An attractive force point $X_g=[x_g,y_g]$ is selected on an attractive force point function established by using the vehicle coordinate system as the coordinate axes, thus an angle between the self-driving vehicle and the attractive force (namely the waypoint) is:

$$\alpha = \arctan(y_g, x_g)$$

The force components of the attractive force in abscissa and ordinate axes are:

$$\begin{cases} F_{att}(x_g) = F_{att} * \cos(\alpha) \\ F_{att}(y_g) = F_{att} * \sin(\alpha) \end{cases}$$

In the vehicle coordinate system, an ith repulsive force point is $X_{ob}(i)=[x_{ob}(i),y_{ob}(i)]$, thus an angle between a corresponding self-driving vehicle and the ith repulsive force point is:

$$\beta_i = \arctan(y_{ob}(i)/x_{ob}(i))$$

The force components of the repulsive force in the abscissa axis and the ordinate axis are:

$$\begin{cases} F_{rep}(x_{ob}(i)) = F_{rep}(i) * \cos(\beta_i) \\ F_{rep}(y_{ob}(i)) = F_{rep}(i) * \sin(\beta_i) \end{cases}$$

An angle between the self-driving vehicle and the total force is:

$$\delta = \arctan((F_{att}(y_g) - F_{rep}(y_{ob}(i)))/(F_{att}(x_g) - F_{rep}(x_{ob}(i))))$$

Where i=0, 1 . . . represents different obstacle, thus the steering angle between the self-driving vehicle and the total force is:

$$\delta_{sw} = \delta * i_s$$

Where, $i_s$ is a transmission ratio of a steering system.

Figure 4:
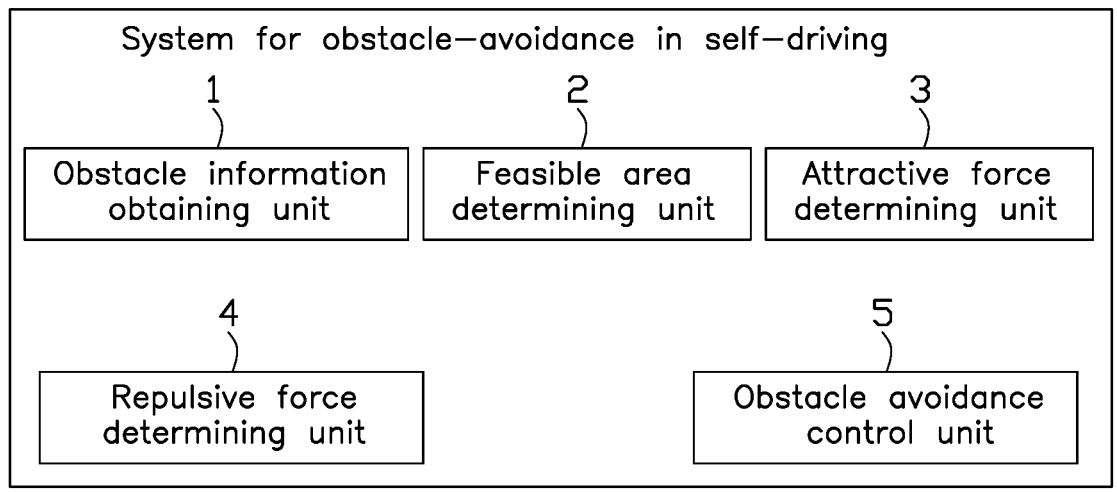
FIG. 4 is a structural diagram of a system for obstacle-avoidance in self-driving according to the present disclosure.

Corresponding to the method, of the aforementioned embodiment, another embodiment of the disclosure provides a system for self-driving obstacle avoidance, which is capable of achieving the method of the aforementioned embodiment. Referring to FIG. 4, the system of the embodiment includes:

An obstacle information obtaining unit 1, being configured to obtain information of the obstacles on the road, where the information of the obstacles includes at least sets of coordinates of the obstacles;

A feasible area determining unit 2, being configured to determine a feasible area according to the information of the obstacles;

An attractive force determining unit 3, being configured to determine a waypoint according to the feasible area, and determining an attractive force of the waypoint to an instant vehicle according to the waypoint and a preset attractive potential field function;

A repulsive force determining unit 4, being configured to determine a repulsive force of the obstacles to the instant vehicle according to the coordinates of the obstacles on sides of the feasible area and a preset repulsive potential field function; and An obstacle avoidance control unit 5, being configured to determine a total force according to the attractive force and the repulsive force, generating a steering angle control command according to the total force, and controlling a vehicle actuator to execute the steering angle control command to achieve the obstacle avoidance.

The units of division is merely a logical function division and may be other division in actual implementation. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

It should be noted that, the system of the aforementioned embodiment corresponds to the method of the aforementioned embodiment. Thus, certain parts not described in the system of the aforementioned embodiment can be obtained by referring to the content of the method of the aforementioned embodiment. Namely, the details of the steps recorded in the method of the aforementioned embodiment can be considered as the function that the system of the embodiment can achieve, and are not repeated redundantly herein.

If the integrated module/unit of the system for self-driving obstacle avoidance is implemented in the form of or by means of a software functional unit and is sold or used as an independent product, all parts of the integrated module/unit of the system for self-driving obstacle avoidance may be stored in a computer-readable storage medium.

In some embodiments, the embodiment of the present disclosure further provides a computer storage medium where computer executable instructions are stored herein, the computer executable instructions are used for executing the method for self-driving obstacle avoidance when the computer executable instructions being executed by at least one processor.

In detail, the computer-readable storage medium may include any entity or device capable of recording and carrying the program codes, recording media, USB flash disk, mobile hard disk, disk, computer-readable storage medium, read-only memory, Random access memory, electrical carrier signals, telecommunications signals, software distribution package, and so on.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for self-driving obstacle avoidance comprising:

obtaining information of obstacles on a road, where the information of the obstacles comprises at least sets of coordinates of the obstacles;

determining a feasible area according to the information of the obstacles;

determining a waypoint according to the feasible area, and determining an attractive force of the waypoint to an instant vehicle according to the waypoint and a preset attractive potential field function;

determining a repulsive force of the obstacles to the instant vehicle according to the coordinates of the obstacles on sides of the feasible area and a preset repulsive potential field function; and determining a total force according to the attractive force and the repulsive force, generating a steering angle control command according to the total force, and controlling a vehicle actuator to execute the steering angle control command to achieve the obstacle avoidance;

wherein determining the feasible area according to the information of the obstacles, comprises:

determining visual borders of one or more obstacles according to the information of the obstacles, each of the obstacles comprising one or more visual borders;

determining one or more feasible areas according to the visual borders of the one or more obstacles, a point O of a center of a body of the instant vehicle, and a minimum turn radius of the instant vehicle;

obtaining safety factors of the one or more feasible areas according to borders of the one or more feasible areas and a relative position between each of the obstacles and the instant vehicle, and obtaining a deviation between a direction of each of the one or more feasible areas and a current heading of the body of the vehicle and a deviation between the direction of each of the one or more feasible areas and a direction of a corresponding waypoint of the waypoints according to the borders of the one or more feasible areas; and selecting one feasible area from the one or more feasible areas to output as the feasible area which is optimal according to the safety factors, the deviation between the direction of each of the one or more feasible areas and the current heading of the body of the vehicle, and the deviation between the direction of each of the one or more feasible areas and the direction of the corresponding waypoint.

2. The method according to claim 1, wherein determining one or more feasible areas according to the visual borders of the one or more obstacles, the point O of the center of the body of the instant vehicle, and the minimum turn radius of the instant vehicle, comprises:

generating, for any obstacle, two arcs which are tangent to a heading of the instant vehicle respectively by a left boundary point of the obstacle, a right boundary point of the obstacle, and the point O, making the left boundary point of the obstacle and the point O to be points of one arc of the two arcs, and the right boundary point of the obstacle and the point O to be points of the other arc of the two arcs, where an area between the two arcs is an infeasible area; and generating two turn radius arcs according to the point O and the minimum turn radius of the instant vehicle, and determining whether a residual area excluding the infeasible area is one feasible area according to the two turn radius arcs, where boundaries of each of the one or more feasible areas comprises a left arc and a right arc.

3. The method according to claim 2, wherein obtaining safety factors of the one or more feasible areas according to borders of the one or more feasible areas and a relative position between each of the obstacles and the instant vehicle, comprises:

using the point O as a center of a circle and a preset radius to generate a reference arc, and determining a width factor of each of the one or more feasible areas according to a length of an arc between a point B and a point C and a length of an arc between a point A and a point D, where the point B and the point C are the points where the reference arc intersects with the left arc and the right arc, and the point A and the point D are points where the reference arc intersects with the two turn radius arcs;

determining a point I of one obstacle closest to the instant vehicle from the points of the obstacles at sides of the feasible areas, and determining a factor of each of the obstacles according to a length of a straight line between the point O and the point I, a length of a straight line between the point B and the point C, a length of a straight line between the point O and the point C, and a width of the instant vehicle; and determining a safety factor of each of the one or more feasible areas according to the width factor of each of the one or more feasible areas and the factor of each of the obstacles.

4. The method according to claim 1, wherein obtaining the deviation between the direction of each of the one or more feasible areas and the current heading of the body of the vehicle and the deviation between the direction of each of the one or more feasible areas and the direction of the corresponding waypoint, comprises:

determining the deviation between the direction of each of the one or more feasible areas and the current heading of the body of the vehicle according to a radius of the arc on a left side of each of the one or more feasible areas and a radius of the arc on a right side of a corresponding feasible area; and determining the deviation between the direction of each of the one or more feasible areas and the direction of the corresponding waypoint according to a radius of a connecting arc between each of waypoints and a center of mass of the vehicle, the radius of the arc on the left side of each of the one or more feasible areas and the radius of the arc on the right side of the corresponding feasible area.

5. The method according to claim 1, wherein determining the attractive force of the waypoint to the instant vehicle according to the waypoint and the preset attractive potential field function, comprises:

determining a longitudinal action parameter of the attractive force according to a difference in longitudinal coordinate between the waypoint and a point of a center of the body of the instant vehicle and a longitudinal action distance of the attractive force field on the instant vehicle, and determining a horizontal action parameter of the attractive force according to a difference in horizontal coordinate between the waypoint and the point of the center of the body of the instant vehicle, and a horizontal action distance of the attractive force field on the instant vehicle; and determining the attractive force of the waypoint to the instant vehicle according to the longitudinal action parameter of the attractive force, the horizontal action parameter of the attractive force, and a preset gain factor of the attractive force.

6. The method according to claim 1, wherein determining the repulsive force of the obstacles to the instant vehicle according to the coordinates of the obstacles on sides of the feasible area and the preset repulsive potential field function, comprises:

determining a longitudinal action parameter of the repulsive force according to a difference in longitudinal coordinate between each of the obstacles and a point of a center of the body of the instant vehicle, and a longitudinal action distance of the repulsive force field on the instant vehicle, and determining a horizontal action parameter of the repulsive force according to a difference in horizontal coordinate between each of the obstacles and the point of the center of the body of the instant vehicle, and a horizontal action distance of the repulsive force field on the instant vehicle; and determining the repulsive force of each of the obstacles to the instant vehicle according to the longitudinal action parameter of the attractive force, the horizontally action parameter of the repulsive force, and a preset gain factor of the repulsive force.

7. The method according to claim 1, wherein determining the total force according to the attractive force and the repulsive force, and generating the steering angle control command according to the total force, comprises:

determining an angle between the instant vehicle and the waypoint according to the coordinates of the waypoint, determining a longitudinal force of the attractive force and a horizontal force of the attractive force according to the angle and the attractive force, and determining a longitudinal force of the repulsive force and a horizontal force of the repulsive force according to the angle and the repulsive force;

determining a longitudinal force of the total force according to the longitudinal force of the attractive force and the longitudinal force of the repulsive force, and determining a horizontal force of the total force according to the horizontal force of the attractive force and the horizontal force of the repulsive force; and determining a steering angle according to the longitudinal force of the total force and the horizontal force of the total force, and generating the steering angle control command according to the steering angle.

8. A non-transitory storage medium storing a set of commands, when the commands being executed by at least one processor of a demo board, causing the at least one processor to:

obtain information of obstacles on a road, where the information of the obstacles comprises at least sets of coordinates of the obstacles;

determine a feasible area according to the information of the obstacles;

determine a waypoint according to the feasible area, and determine an attractive force of the waypoint to an instant vehicle according to the waypoint and a preset attractive potential field function;

determine a repulsive force of the obstacles to the instant vehicle according to the coordinates of the obstacles on sides of the feasible area and a preset repulsive potential field function;

determine a total force according to the attractive force and the repulsive force, generate a steering angle control command according to the total force, and control a vehicle actuator to execute the steering angle control command to achieve an obstacle avoidance, determine visual borders of one or more obstacles according to the information of the obstacles, each of the obstacles comprising one or more visual borders;

determine one or more feasible areas according to the visual borders of the one or more obstacles, a point O of a center of a body of the instant vehicle, and a minimum turn radius of the instant vehicle;

obtain safety factors of the one or more feasible areas according to borders of the one or more feasible areas and a relative position between each of the obstacles and the instant vehicle, and obtain a deviation between a direction of each of the one or more feasible areas and a current heading of the body of the vehicle and a deviation between the direction of each of the one or more feasible areas and a direction of a corresponding waypoint of the waypoints according to the borders of the one or more feasible areas; and select one feasible area from the one or more feasible areas to output as the feasible area which is optimal according to the safety factors, the deviation between the direction of each of the one or more feasible areas and the current heading of the body of the vehicle, and the deviation between the direction of each of the one or more feasible areas and the direction of the corresponding waypoint.

9. The non-transitory storage medium according to claim 8, further causing the at least one processor to:

generate, for any obstacle, two arcs which are tangent to a heading of the instant vehicle respectively by a left boundary point of the obstacle, a right boundary point of the obstacle, and the point O, making the left boundary point of the obstacle and the point O to be points of one arc of the two arcs, and the right boundary point of the obstacle and the point O to be points of the other arc of the two arcs, where an area between the two arcs is an infeasible area; and generate two turn radius arcs according to the point O and the minimum turn radius of the instant vehicle, and determine whether a residual area excluding the infeasible area is one feasible area according to the two turn radius arcs, where boundaries of each of the one or more feasible areas comprises a left arc and a right arc.

10. The non-transitory storage medium according to claim 9, further causing the at least one processor to:

use the point O as a center of a circle and a preset radius to generate a reference arc, and determine a width factor of each of the one or more feasible areas according to a length of an arc between a point B and a point C and a length of an arc between a point A and a point D, where the point B and the point C are the points where the reference arc intersects with the left arc and the right arc, and the point A and the point D are points where the reference arc intersects with the two turn radius arcs;

determine a point I of one obstacle closest to the instant vehicle from the points of the obstacles at sides of the feasible areas, and determine a factor of each of the obstacles according to a length of a straight line between the point O and the point I, a length of a straight line between the point B and the point C, a length of a straight line between the point O and the point C, and a width of the instant vehicle; and determine a safety factor of each of the one or more feasible areas according to the width factor of each of the one or more feasible areas and the factor of each of the obstacles.

11. The non-transitory storage medium according to claim 8, further causing the at least one processor to:

determine the deviation between the direction of each of the one or more feasible areas and the current heading of the body of the vehicle according to a radius of the arc on a left side of each of the one or more feasible areas and a radius of the arc on a right side of a corresponding feasible area; and determine the deviation between the direction of each of the one or more feasible areas and the direction of the corresponding waypoint according to a radius of a connecting arc between each of waypoints and a center of mass of the vehicle, the radius of the arc on the left side of each of the one or more feasible areas and the radius of the arc on the right side of the corresponding feasible area.

12. The non-transitory storage medium according to claim 8, further causing the at least one processor to:

determine a longitudinal action parameter of the attractive force according to a difference in longitudinal coordinate between the waypoint and a point of a center of the body of the instant vehicle and a longitudinal action distance of the attractive force field on the instant vehicle, and determine a horizontal action parameter of the attractive force according to a difference in horizontal coordinate between the waypoint and the point of the center of the body of the instant vehicle, and a horizontal action distance of the attractive force field on the instant vehicle; and determine the attractive force of the waypoint to the instant vehicle according to the longitudinal action parameter of the attractive force, the horizontal action parameter of the attractive force, and a preset gain factor of the attractive force.

13. The non-transitory storage medium according to claim 8, further causing the at least one processor to:

determine a longitudinal action parameter of the repulsive force according to a difference in longitudinal coordinate between each of the obstacles and a point of a center of the body of the instant vehicle, and a longitudinal action distance of the repulsive force field on the instant vehicle, and determine a horizontal action parameter of the repulsive force according to a difference in horizontal coordinate between each of the obstacles and the point of the center of the body of the instant vehicle, and a horizontal action distance of the repulsive force field on the instant vehicle; and determine the repulsive force of each of the obstacles to the instant vehicle according to the longitudinal action parameter of the attractive force, the horizontally action parameter of the repulsive force, and a preset gain factor of the repulsive force.

14. The non-transitory storage medium according to claim 8, further causing the at least one processor to:

determine an angle between the instant vehicle and the waypoint according to the coordinates of the waypoint, determining a longitudinal force of the attractive force and a horizontal force of the attractive force according to the angle and the attractive force, and determining a longitudinal force of the repulsive force and a horizontal force of the repulsive force according to the angle and the repulsive force;

determine a longitudinal force of the total force according to the longitudinal force of the attractive force and the longitudinal force of the repulsive force, and determining a horizontal force of the total force according to the horizontal force of the attractive force and the horizontal force of the repulsive force; and determine a steering angle according to the longitudinal force of the total force and the horizontal force of the total force, and generating the steering angle control command according to the steering angle.

* * * * *